United States Patent [19]

Guerzoni

[11] Patent Number: 4,462,516
[45] Date of Patent: Jul. 31, 1984

[54] CONTAINER ORIENTING AND DIRECTING APPARATUS

[75] Inventor: Alessandro Guerzoni, Bologna, Italy

[73] Assignee: G.A.R.BO. s.n.c. di Guerzoni Alessandro e Renato, Calderara di Reno, Italy

[21] Appl. No.: 337,198

[22] Filed: Jan. 5, 1982

[51] Int. Cl.³ .............................................. B65G 47/26
[52] U.S. Cl. .................................... 198/427; 198/367; 198/461
[58] Field of Search .............. 198/437, 442, 427, 718, 198/426, 367, 370, 459, 475, 461

[56] References Cited

U.S. PATENT DOCUMENTS

| | | | |
|---|---|---|---|
| 1,224,379 | 5/1917 | Honohan | 198/732 |
| 3,342,303 | 9/1967 | Onulak | 198/442 |
| 3,731,784 | 5/1973 | Osborne | 198/442 |
| 3,994,389 | 11/1976 | Blair | 198/719 |
| 4,069,908 | 1/1978 | Johnson et al. | 198/437 |

FOREIGN PATENT DOCUMENTS 7501573  8/1976  Netherlands .................. 198/436

Primary Examiner—Robert J. Spar
Assistant Examiner—Jonathan D. Holmes
Attorney, Agent, or Firm—Pollock, Vande Sande & Priddy

[57] ABSTRACT

Apparatus for orienting and quickly directing into a plurality of container conveying channels a single file of containers, even irregularly shaped ones, comprising a feeding conveyor on which the single file of containers is caused to travel in a guided manner; a screw feeder for controlling the flow of the containers on the conveyor, and for suitably spacing them; a further conveyor with equispaced fingers for keeping a given number of containers in the spaced position; and deflecting blades for diverting the containers into sorting channels leading to the container conveying channels.

5 Claims, 3 Drawing Figures

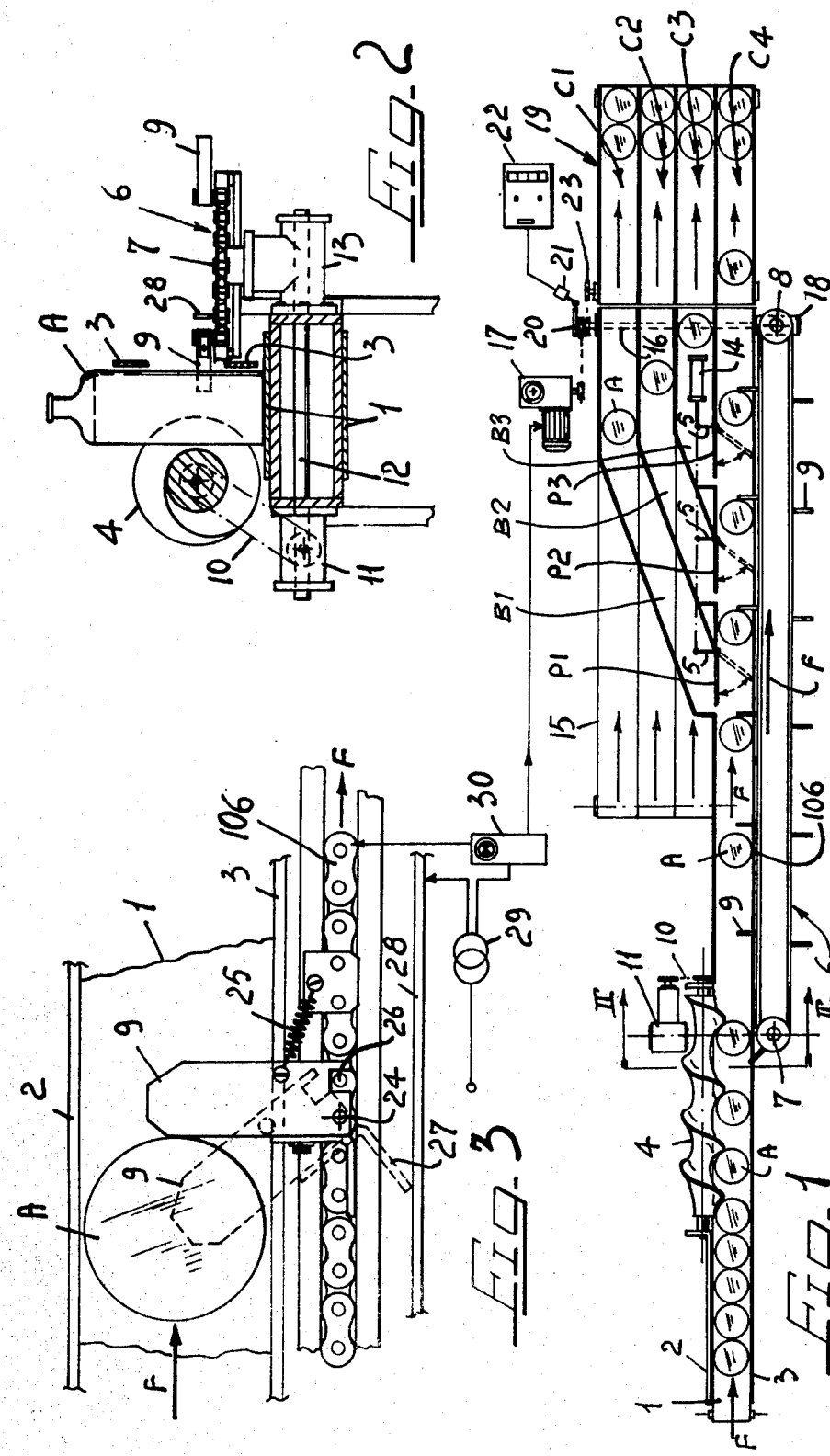

CONTAINER ORIENTING AND DIRECTING APPARATUS

SUMMARY OF THE INVENTION

The invention relates to an apparatus for orienting and for directing into a plurality of conveying channels containers of any size and material, even irregularly shaped, which are fed to the apparatus in single file.

Devices of this kind are known, in which there is provided an Archimedean screw (screw feeder) arranged parallel to and partly over the container conveying line, on which the containers are caused to travel.

In these prior art devices, the screw feeder is of a length such that it extends up to the deflecting blades provided on the opposite side of the conveying line, at the inlets of the sorting channels leading to the conveying channels. This screw feeder is continuously driven in rotation so as to determine in its initial section the correct orientation and spacing apart of the containers being fed thereto. The spaced out containers are then retained by the subsequent section of the screw feeder, which is much longer than its initial section, at such a distance from one another that the correct number of them will be brought into abutment against the opened deflecting blades obliquely standing in their working position, across the feeding line. The deflecting blades are upon control simutaneously shifted into their working position, in-phase with the arrival of the containers, so that they will each divert a container into a respective one of the sorting channels, whereupon they will be returned to their rest position.

In the apparatus according to the invention, a screw feeder of reduced length is used only for orienting and suitably spacing apart the containers. The function of keeping the containers in predetermined spaced position and of bringing them into abutment with the deflecting blades that will divert them into the sorting channels is here assigned to a conveyor which is provided in place of the longer subsequent section of the prior art screw feeder and which can be predisposed for an operation with a wide range of differently sized containers. Moreover, this conveyor is of simpler construction, and also constitutes a safety device, since it is capable of automatically stopping the apparatus whenever a container jams in the feeding line.

BRIEF DESCRIPTION OF THE DRAWINGS

The characteristic features of the apparatus according to the invention and the advantages arising therefrom will appear evident in the following specification made with reference to the accompanying drawings, in which:

FIG. 1 is a plan view diagrammatically showing the apparatus according to the invention.

FIG. 2 is a sectional view on line II—II of FIG. 1, which shows some details in the construction of the apparatus according to the invention.

FIG. 3 is an enlarged plan view of a portion of the conveyor.

DESCRIPTION OF THE PREFERRED EMBODIMENT

In FIGS. 1 and 2, reference numeral 1 indicates the straight horizontal conveyor which is continuously operated in the direction of arrow F, and on which the containers A are caused to travel in single file, thanks to the provision of parallel guides 2, 3, the distance between which is adjustable according to the width of the containers.

Laterally of and in parallel relation with conveyor 1 there is provided a screw feeder 4, as a substitute for a section of guide 2. The screw feeder 4 is arranged partly over the conveyor 1 and is continuously driven in rotation so as to feed in the direction of arrow F, at the speed required for controlling the flow of the containers which are thus suitably spaced from one another.

The said screw 4 has a length which is much shorter than that of prior art screw feeders, since its function is limited to intercepting the flow of the containers and suitable spacing them. The task of keeping a given number of containers in spaced and feeding conditions for engagement with the deflecting blades P1, P2, P3 at the inlets of the sorting channels B1, B2, B3 is assigned to a unit which will be described hereinafter.

The said unit is a suitably long conveyor 6, e.g., a chain conveyor which is arranged on the side of guide 3 of conveyor 1, with its inlet end in operative engagement with the outlet end of the screw feeder 4, and which also moves in the direction of arrow F.

The chain conveyor 6 is driven on sprocket wheels 7 and 8 keyed onto vertical shafts, is continuously operated at the required speed, and at least its branch 106 is guided parallel to the longitudinal axis of conveyor 1.

The conveyor 6 is provided with a plurality of equispaced, outwardly projecting fingers 9 extending transversely, when in their working position, over the feeding channel formed by conveyor 1 and by its side guides 2l3, and longitudinally sweeping this channel when the said fingers are caused to run along the branch 106 of conveyor 6. As shown in FIG. 2, the fingers 9 are set over the conveyor 1 at such a level as to not compromise the stability of the containers A to be engaged thereby.

The fingers 9 are pivotably attached at 24 to conveyor 6, and by a respective spring means 25 are kept in their working position, in which they are retained thanks to the provision of a catch 26. Every finger 9 is thus allowed to swing backwards, against the action of spring 25, and to assume the position shown by dash line in FIG. 3.

This arrangement assures safe operation of conveyor 6 and the integrity of the containers, since the finger 9 coming into contact with a container A jammed in the feeding channel will be pivoted backwards by reaction, with its metallic appendage 27 into abutment with a contact member 28. The contact member 28 is in form of a metallic rod substantially of the same length as conveyor 6. It is arranged parallel to the branch 106 of conveyor 6 and is mounted on a support with the interposition of electric insulation means. The contact rod 28 and the frame of the apparatus are connected in an electric circuit fed by a low voltage source 29. Thus, whenever this circuit is closed by the interference of members 27 and 28, it promotes the intervention of a unit 30 for the stopping of the speed changing and reduction unit 17, and therefore of the whole apparatus. The said electric circuit preferably also promotes the actuation of means for signalling trouble in the operation of the apparatus.

The operation of the conveyor 6 and the screw feeder 4 is synchronized, for example, by means of a positive drive 10 of the sprocket wheel and chain type, which connects the screw feeder to an angle drive 11, which in turn is kinematically connected through shaft 12 to another angle drive 13 having the sprocket wheel 7 of conveyor 6 keyed onto its shaft.

The running speed of conveyor 6 is so correlated with the speed of rotation of the screw feeder 4, and the fingers 9 are so arranged in equispaced relation that at least one container A will be fed in-phase into each compartment of conveyor 6, each compartment being defined by two consecutive fingers 9, and owing to the higher speed of conveyor 1, the container will be entrained into abutment with the leading finger of its own compartment. Thus, at predetermined intervals, which are controlled by suitable means, a container A will be correctly led by conveyor 6 to the inlet of each of the sorting channels B1, B2, B3, each provided with a deflecting blade P1, P2, P3.

The deflecting blades are normally in the rest position shown by a solid line in FIG. 1. In timed relation with the arrival of the containers in front of the sorting channels, these blades are simultaneously shifted into their open or working position, shown by dash lines in FIG. 1. When in their working position, the deflecting blades are obliquely positioned across the conveyor 1, without interfering with fingers 9, and so as to intercept, and to divert, at every deflecting cycle, an incoming container A into one of the sorting channels B1, B2, B3. The deflecting blades are then returned into their rest position, ready for the next deflecting cycle.

The containers entering into the sorting channels B1, B2, B3 are forwarded to a further conveyor 19 by the composite conveyor 15, which at its leading end is driven on the same shaft 16 as conveyor 1. Shaft 16 is powered through the speed changing and reduction unit 17 and through an angle drive 18. The same shaft also transmits the motion to conveyor 6, which in turn transmits the motion to the screw feeder 4.

From shaft 16, through a transmission 23 of any suitable type, there is preferably derived the rotation for driving the conveyor 19.

The conveyor 19 is provided with four parallel container conveying channels C1, C2, C3, C4. Channels C1, C2, C3 are respectively connected to the container sorting channels B1, B2, B3 while channel C4 is arranged in line with conveyor 1, from which it directly receives the containers.

Consequently, at every deflecting cycle, the deflecting blades P1, P2, P3 are simultaneously shifted into their open or working position only after a container A has passed the blade P3.

The means for operating the opening and closing of each one of the deflecting blades preferably consists of a pneumatic cylinder-and-piston unit 14 which through a link 105 is connected to the crank 5 of each deflecting blade. The cyclical control for opening and closing the deflecting blades P1, P2, P3 is obtained by means of a suitably profiled cam 20. Cam 20 derives its motion from the kinematic chain of which the several conveyors from part, either directly or with the interposition of speed reducing means.

A sensor 21 senses the profile of cam 20, and in the case in which the apparatus should be set for an operation with a number of conveying channels other than four, the said sensor is operatively connected to a progammable counting unit 22, which cyclically emits the control for actuation of the pneumatic unit 14.

I claim:

1. Apparatus for orienting and directing into a plurality of container conveying channels a single file of randomly shaped containers, comprising
(a) a first conveyor on which said single file of containers is caused to travel in a guided manner;
(b) means for controlling the flow of said containers on said first conveyor, and for suitably spacing them, comprising a screw means arranged partly over said first conveyor and continuously driven in rotation;
(c) a second conveyor provided with equi-spaced metallic fingers having one of their ends pivotably attached to said second conveyor and provided on their pivoted ends with an outwardly extending appendage, said fingers, when in working position, extending outwardly therefrom and transversely over said first conveyor, so as to longitudinally sweep it, and within which fingers at least one container is received from said screw means and is retained in the required spaced position, the operation of said second conveyor being synchronized with the operation of said screw means, and said second conveyor being arranged laterally and longitudinally of said first conveyor, with at least its active branch in parallel relation thereto, and running in the same direction as said first conveyor; and
(d) deflecting blades for diverting said containers into sorting channels leading to container conveying channels, a given number of containers being led in-phase by said second conveyor into contact with said deflecting blades, said blades being, upon control, simultaneously shifted into their working position, each before a respective one of said containers so as to direct a said container into the corresponding sorting channel, and then being returned to their rest positions for the next deflecting cycle.

2. Apparatus according to claim 1, wherein said screw means consists of an Archimedean screw feeder.

3. The apparatus according to claim 1, wherein said fingers are urged by spring means into their working position transversely over said first conveyor, and are arranged to swing backwards, upon engagement with a container jammed in the feeding line, with their said appendages contacting a component of an electric circuit fed by a low voltage source, so as to determine its closure, said component consisting of a metallic rod arranged longitudinally of and parallel with said second conveyor and which with the interposition of electric insulation means is mounted on its own support, and is connected to one end of said circuit, which has its other end connected to the frame of said apparatus, said electric circuit piloting a safety unit, so that its closure will cause stoppage of said apparatus.

4. Apparatus according to claim 3, wherein said closure of said safety unit also actuates an alarm signal upon jamming of a container in said feeding line.

5. Apparatus according to claim 1, wherein one of said sorting channels is arranged in line with said first conveyor so that it receives the containers directly from the latter, said deflecting blades being cyclically shifted into their working positions only after at least one container has passed the zone controlled by said blades.

* * * * *